(12) United States Patent
Rosenfeld et al.

(10) Patent No.: US 8,115,948 B2
(45) Date of Patent: Feb. 14, 2012

(54) INTERACTIVE PAPER SYSTEM

(75) Inventors: Daniel Allen Rosenfeld, Seattle, WA (US); Kumar H. Chellapilla, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1087 days.

(21) Appl. No.: 11/379,649

(22) Filed: Apr. 21, 2006

(65) Prior Publication Data

US 2007/0247665 A1    Oct. 25, 2007

(51) Int. Cl.
G06F 3/12 (2006.01)

(52) U.S. Cl. ....... 358/1.15; 358/474; 358/505; 358/537; 358/538; 382/306; 382/305; 382/186; 382/187; 715/541

(58) Field of Classification Search .......... 358/1.15, 358/474, 505, 537–538; 382/306, 305, 186, 382/187; 715/541
See application file for complete search history.

(56) References Cited

U.S. PATENT DOCUMENTS

| | | | |
|---|---|---|---|
| 5,692,073 A * | 11/1997 | Cass ........................... 382/219 |
| 5,754,629 A | 5/1998 | Kunimori et al. |
| 6,256,662 B1 | 7/2001 | Lo et al. |
| 6,269,341 B1 * | 7/2001 | Redcay, Jr. ...................... 705/8 |
| 6,480,304 B1 | 11/2002 | Os et al. |
| 6,487,611 B1 | 11/2002 | Brusky et al. |
| 6,549,939 B1 | 4/2003 | Ford et al. |
| 6,604,157 B1 | 8/2003 | Brusky et al. |
| 6,646,765 B1 | 11/2003 | Barker et al. |
| 6,675,356 B1 * | 1/2004 | Adler et al. .................... 715/200 |
| 6,909,805 B2 * | 6/2005 | Ma et al. ........................ 382/170 |
| 6,917,438 B1 | 7/2005 | Yoda et al. |
| 7,002,712 B2 | 2/2006 | Barker et al. |
| 7,224,991 B1 | 5/2007 | Fuoss et al. |
| 7,266,761 B2 | 9/2007 | Levine et al. |
| 7,392,933 B2 | 7/2008 | Hepworth et al. |
| 7,505,162 B2 | 3/2009 | Tan |
| 2001/0003177 A1 * | 6/2001 | Schena et al. .................... 705/27 |
| 2001/0014908 A1 | 8/2001 | Lo et al. |
| 2002/0038247 A1 | 3/2002 | Kambayashi et al. |
| 2002/0052888 A1 | 5/2002 | Sellen et al. |
| 2002/0138476 A1 * | 9/2002 | Suwa et al. ........................ 707/3 |
| 2005/0198085 A1 | 9/2005 | Blakey et al. |
| 2005/0219556 A1 | 10/2005 | Lee et al. |
| 2005/0275874 A1 | 12/2005 | Rothwell |

(Continued)

OTHER PUBLICATIONS

HP PCS 2500 Photosmart series all-in-one, reference guide, Hewlett-Packard, 2003, 246 pages.

*Primary Examiner* — King Poon
*Assistant Examiner* — Jacky X Zheng
(74) *Attorney, Agent, or Firm* — Senniger Powers LLP

(57) ABSTRACT

A printer, scanner device and methods for using same are described herein. A printer device may include a dedicated input that, when actuated, generates and sends a request to a computer for known data or a predetermined print job, e.g., schedule information from a personal information management (PIM) application. A scanner device may include another dedicated input that, when actuated, automatically scans a document fed to the device by the user and sends the scanned image to IM (or other) software on a computer, bypassing the need to manipulate the scanned image using scanner software. The device may be used with printed metapaper, which includes a barcode or other indicia identifying the metapaper and corresponds to a stored template image of the metapaper. When the metapaper is rescanned, the scan can be compared to the stored template information to identify changes and synchronize the changes with the IM software.

5 Claims, 11 Drawing Sheets

U.S. PATENT DOCUMENTS

| | | |
|---|---|---|
| 2006/0018546 A1* | 1/2006 | Lagardere et al. ............ 382/186 |
| 2006/0077429 A1 | 4/2006 | Zhang et al. |
| 2006/0232795 A1 | 10/2006 | Tsuboi et al. |
| 2007/0139725 A1 | 6/2007 | Hutter |
| 2007/0247655 A1* | 10/2007 | Rosenfeld et al. ........... 358/1.15 |
| 2007/0247665 A1 | 10/2007 | Rosenfeld et al. |
| 2007/0247673 A1* | 10/2007 | Rosenfeld et al. ............ 358/474 |

* cited by examiner

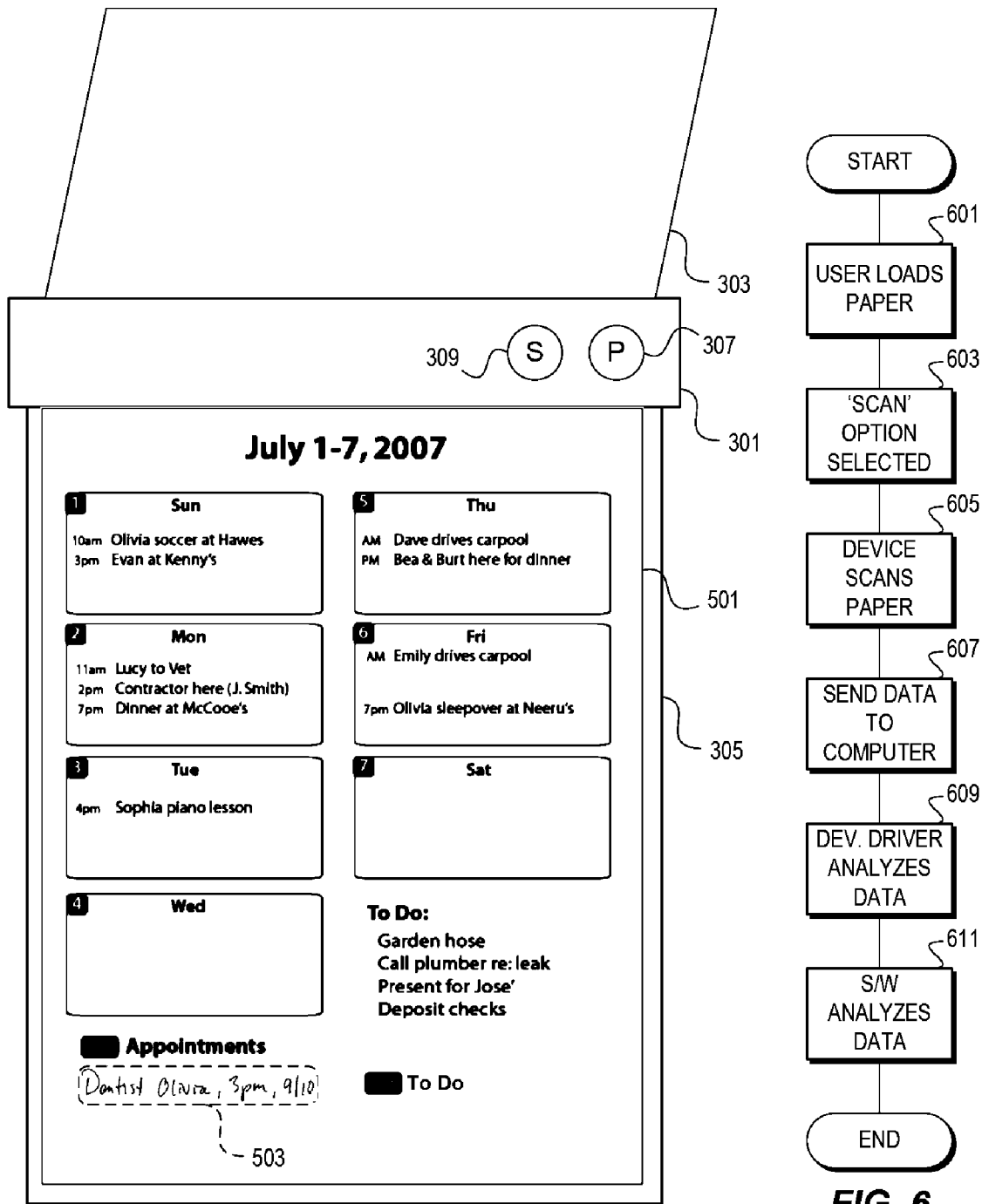

```
<METAPAPER>
  INDEX=01004734
  USER=Emily
  APPLICATION=Outlook
  <TEMPLATE>
    BITMAP="111000101...00101000"
    UNITS=Inches; PAPER=8.5,11
    <REGIONS>
        <REGION>
            ID=1105; OFFSET=0.3,8.0; SIZE=3.8,1.8; DATA=07/01/2007; CONTENT=...
        </REGION>
        <REGION>
            ID=1107; OFFSET=0.3,6.1; SIZE=3.8,1.8; DATA=07/02/2007; CONTENT=...
        </REGION>
        <REGION>
            ID=1109; OFFSET=0.3,4.3; SIZE=3.8,1.8; DATA=07/03/2007; CONTENT=...
        </REGION>
        <REGION>
            ID=1111; OFFSET=0.3,2.3; SIZE=3.8,1.8; DATA=07/04/2007; CONTENT=...
        </REGION>
        <REGION>
            ID=1113; OFFSET=4.8,8.0; SIZE=3.8,1.8; DATA=07/05/2007; CONTENT=...
        </REGION>
        <REGION>
            ID=1115; OFFSET=4.8,6.1; SIZE=3.8,1.8; DATA=07/06/2007; CONTENT=...
        </REGION>
        <REGION>
            ID=1117; OFFSET=4.8,4.3; SIZE=3.8,1.8; DATA=07/07/2007; CONTENT=...
        </REGION>
        <REGION>
            ID=1119; OFFSET=0.4,0.3; SIZE=3.7,1.9; DATA=Appointment; CONTENT=...
        </REGION>
        <REGION>
            ID=1121; OFFSET=4.5,0.3; SIZE=3.6,1.4; DATA=To-Do; CONTENT=...
        </REGION>
    </REGIONS>
  </TEMPLATE>
</METAPAPER>
```

July 1-7, 2007 

1 Sun
- 10am Olivia soccer at Hawes
- 3pm Evan at Kenny's

2 Mon
- 11am Lucy to Vet
- 2pm Contractor here (J. Smith)
- 7pm Dinner at McCooe's

3 Tue
- 4pm Sophia piano lesson

4 Wed

■ Appointments

5 Thu
- AM Dave drives carpool
- PM Bea & Burt here for dinner

6 Fri
- AM Emily drives carpool
- 7pm Olivia sleepover at Neeru's

7 Sat
- 3pm Dentist Olivia — 1603

To Do:
- Garden hose
- Call plumber re: leak
- Present for Jose'
- Deposit checks — 1605
- GAME NIGHT ■ To Do

*FIG. 16*

INTERACTIVE PAPER SYSTEM

BACKGROUND

Personal information management (PIM) software has improved considerably in recent years. People use PIM software everyday to manage email, tasks, calendars, and schedule information, and contacts, among other information. Businesses rely heavily on PIM software as well, to coordinate meetings, communications, assignments, projects, contact information, etc. PIM software has become a centralized location in which individuals and businesses store more and more information.

PIM users often take their computers with them, specifically to have access to this information. Sometimes it is not convenient for a user to take a computer to a location that the user might want to access data in the PIM software. In such instances, users may print out the desired information by manually opening a PIM application on his or her computer, selecting a data view that displays the desired information, and then printing the data view, e.g., by performing a File|Print selection from a menu of the PIM application. While this provides the desired information, such a process is tedious and often inconvenient for a user. For example, in a family environment, the family computer might be in a room in the family home that is used as an office or den. The user wanting the information might be in a hurry, e.g., grabbing her keys and heading out of the house when she realizes that she forgot some important list or other data. The user is inconvenienced by having to go back to the room where the computer is located, possibly boot up the computer, launch the PIM application, select or search for the desired data, instruct the PIM application to print the data, and then wait for the printout.

While the advent of wireless all-in-one printer/scanner/fax devices, such as the PSC-2510 by Hewlett-Packard Company of Palo Alto, Calif., has reduced the number of peripheral devices that need to be attached to a computer, the development of such devices has stagnated, and there is no integration between such devices and PIM software to speed up data gathering and printing processes that are manually performed by users of these systems.

BRIEF SUMMARY

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

According to a first aspect, one or more computer readable media may store executable instructions for performing a method of managing printed data. The method may include receiving a print request to print a known view of a certain data. Template information corresponding to the print request is stored, where the template information includes a template index or ID and template region information identifying a layout of one or more regions on a printed document to be printed based on the print request. A print job is generated based on the print request, where the print job defines the printed document. The printed document may include a first indicia, e.g., a barcode, identifying the template index. The print job is sent to a printer for printing the printed document. The template may later be used for comparison to a scanned document to detect changes.

According to another aspect, one or more computer readable media may store executable instructions for synchronizing data received from a scanned document. The synchronizing method may include extracting an ID indicia, e.g., a barcode, from a digital image of a scanned document, querying a template database for template information corresponding to the ID indicia (e.g., having an index identified by the barcode), and comparing the digital image with template information returned by the query to identify on the scanned document a first handwritten annotation made subsequent to a time when the scanned document was printed.

Yet another aspect provides a method and computer readable media storing executable instructions for performing the method of creating an entry in an information management software application. The method may include extracting from a scanned document a first handwritten annotation, determining a type of information corresponding to the first handwritten annotation, and storing the first handwritten annotation in an information management software application as a description for an entry corresponding to the type of information. In variations of this aspect, the method may further include extracting from the scanned document a second handwritten annotation identifying a date, converting the second handwritten annotation to a date value identifying the date, and storing the date value as being associated with the entry. Another variation may include extracting from the scanned document a third handwritten annotation identifying a time, converting the third handwritten annotation to a time value identifying the time, and storing the time value as being associated with the entry. In one example the type of information is an appointment, the date identifies an appointment date, the time identifies an appointment time, and the first handwritten annotation describes the appointment. Thus, the information management application may convert date and time annotations to data values, while retaining the handwritten annotation to describe the entry itself.

These and other aspects are described in more detail below.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIG. 5 illustrates a printer scanner device according to various aspects described herein.

FIG. 6 illustrates a scanning method according to various aspects described herein.

FIG. 12 illustrates template information described in a markup language according to various aspects described herein.

FIG. 16 illustrates an updated metapaper printout according to various aspects described herein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
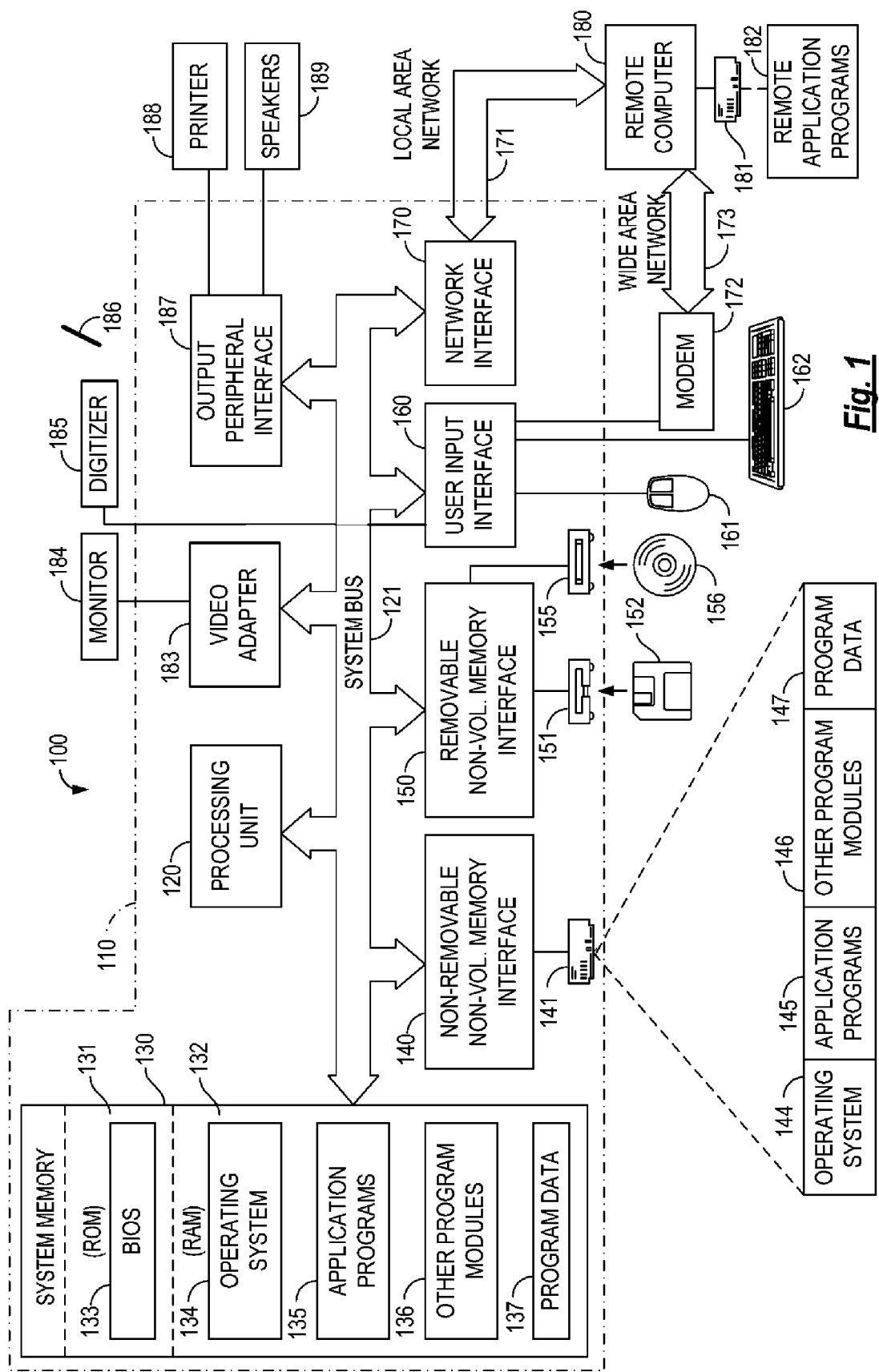
FIG. 1 illustrates a schematic diagram of a general-purpose digital computing environment in which certain aspects may be implemented.

FIG. 1 illustrates an example of a suitable general purpose computing system environment 100 on which one or more illustrative aspects may be implemented. The computing system environment 100 is only one example of a suitable computing environment and is not intended to suggest any limitation as to the scope of use or functionality of features described herein. Neither should the computing environment 100 be interpreted as having any dependency or requirement relating to any one or combination of components illustrated in the environment 100.

Aspects are operational with numerous other general purpose or special purpose computing system environments or configurations. Examples of well known computing systems, environments, and/or configurations that may be suitable for use with aspects of the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing one or more aspects of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 184 or other type of display device is also connected to the system bus 121 via an interface, such as a video adapter 183. Computer 110 may also include a digitizer 185 for use in conjunction with monitor 184 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a wired or wireless network interface or adapter 170. When used in a WAN networking environment, the computer 110 typically includes a modem 172 or other means for establishing communications over the WAN 173, such as the Internet. Computer 110 may also connect to a WAN via the LAN 171. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions (i.e., software), such as in a notification manager software object, routine or function (collectively referred to herein as a notification manager) stored in system memory 130 or non-volatile memory 141, 152, 156 as application programs 135, 145, program modules 136, 146, and/or program data 137, 147. The software may alternatively be stored remotely, such as on remote computer 180 with remote application programs 182. Generally, program modules include routines, programs, objects, components, data structures, etc. that perform particular tasks or implement particular abstract data types when executed by a processor in a computer or other device. The computer executable instructions may be stored on a computer readable medium such as a hard disk 141, optical disk 156, removable storage media 152, solid state memory, RAM 132, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Figure 2:
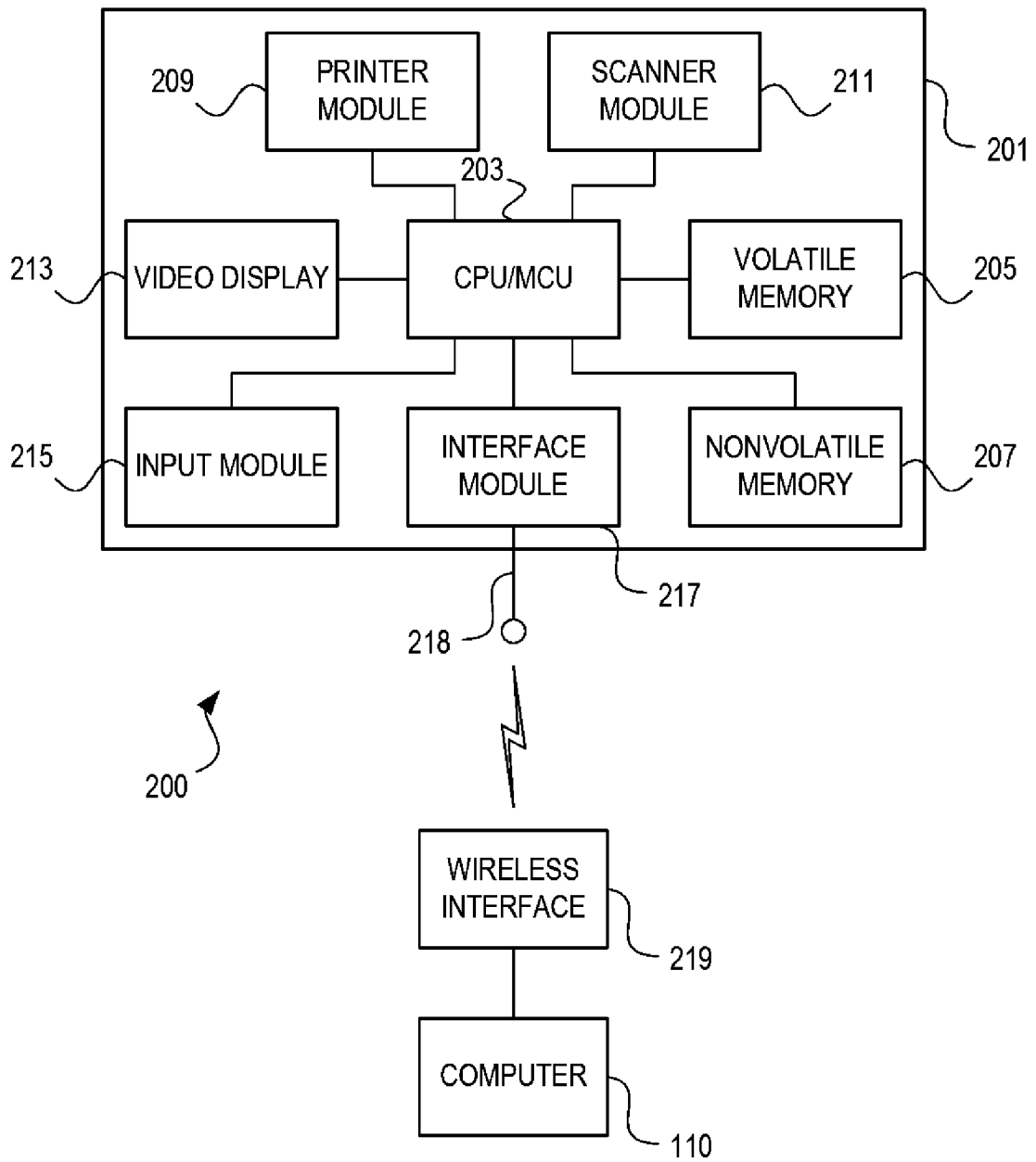
FIG. 2 illustrates a block diagram of a system architecture according to various aspects described herein.

With further reference to FIG. 2, various aspects described herein are directed to a system 200 including a printer scanner device 201 interconnected with a personal information management (IM) system executing on a data processing device, such as computer 110. Device 201 may include, or take the place of, or be used in addition to, printer 188 (FIG. 1). As used herein, an information manager (IM) application refers to an application designed to manage personal, family, group, and/or business information, as well as communications. Examples of such software include personal information management (IM) applications such as, but not limited to, Outlook® by Microsoft Corporation of Redmond, Wash., Lotus® Notes® by IBM Corp. of Armonk, N.Y., and GroupWise® by Novell, Inc. of Waltham, Mass. Other information management applications may be used as well or instead, and such applications are not limited to merely personal information management, but may include family information management, business information management, group information management, and the like. All such software is generically referred to herein as IM software 135, 145 or a IM application 135, 145, e.g., residing in computer memory 141 and/or in system memory 130, respectively.

Device 201 may include various functional components and subsystems, operating under control of a central processing unit or microcontroller unit (CPU/MCU) 203. Device 201 may include a volatile memory 205, e.g., RAM, usable as runtime memory by CPU/MCU 203, and may also include nonvolatile memory 207, e.g., flash or ROM, storing the software executable by CPU/MCU 203 to control overall operation of device 201 as described herein. Device 201 may include a printer module or subsystem 209 that prints on whatever media is fed through device 201, e.g., paper, photos, transparencies, etc. Printer module 209 may further include a motor and motor driver that controls one or more print heads and print head control circuits of the device 201. Device 201 may include a scanner module or subsystem 211 to scan media into a digital image or format storable on device 201 and/or computer 110. Scanner module 211 may include, e.g., a linear CCD scanner and associated interface circuitry, as well as a DC motor and motor driver (the same or separate from that used for printer module 209) to move the paper and/or scan head as needed.

Device 201 may include a video display 213, such as an LCD screen. Other video output displays may alternatively be used. Device 201 may also include an input module 215 through which a user can provide input to device 201. Input system 215 may include one or more physical buttons on the housing of device 201 that have associated functions, or may include one or more soft buttons associated with the display 213.

Device 201 may further include an interface module 217 through which device 201 communicates with computer 110. Interface module 217 may include a wired or wireless network interface, and/or USB and/or parallel cable connections. Wireless "virtual cable" connections are also possible, such as a Bluetooth connection to computer 110. Where interface module 217 includes a wireless network interface, e.g., an 802.11 or similar interface, device 201 may communicate via antenna 218 with a wireless interface 219 associated with computer 110. Wireless interface 219 may include a wireless network adapter directly integrated within computer 110, or may include a separate wireless device, such as a wireless router, wireless access point, wireless bridge, etc. Computer 110 may execute a device driver corresponding to device 201, which manages communications to and from device 201, and directs communications as described herein.

Figures 3, 4:
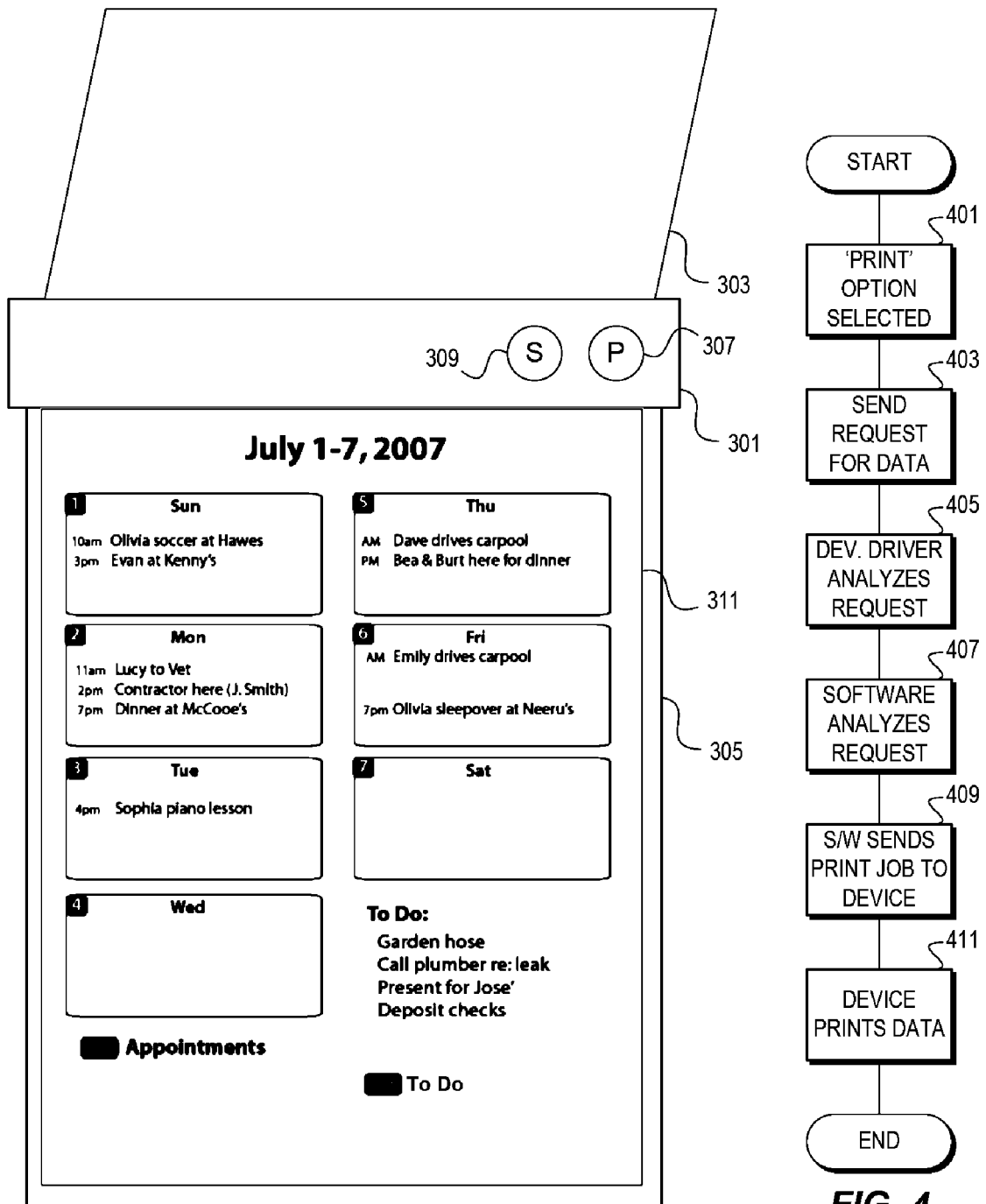
FIG. 3 illustrates a printer scanner device according to various aspects described herein.
FIG. 4 illustrates a printing method according to various aspects described herein.

FIG. 3 illustrates one possible form factor for device 201, represented here as device 301. Device 301 may include the subsystems and modules of device 201 depicted in FIG. 2. Device 301 may also include a paper feeder 303, a paper output tray 305, and input buttons 307, 309. Input buttons 307, 309 may be under the control of input module 215. Input button 307 may correspond to a predefined printing function, and input button 309 may correspond to a predefined scanning function. The printer module (not shown) of device 301 might include basic black/white and/or color printing capabilities, so as to maintain a small form factor.

With further reference to FIG. 4, according to an illustrative aspect, when a user presses input button 307 corresponding to the print function, device 301 generates and sends a print request to computer 110 to print predefined data, and prints the data sent back by computer 110. In step 401, device 301 detects that a user actuated button 307, which indicates a desire by the user to print predefined data, e.g., his or her weekly schedule. In step 403, device 301 automatically generates and sends a print request via interface module 217 to computer 110. The print request may include a code or identifier indicating the print request should be directed to IM software 135, and that the print request is for the predefined data. For example, the print request may be coded to correspond to a daily schedule of a default user of IM software 135. In step 405, a device driver or equivalent service executing on computer 110 analyzes the request and determines that the print request is directed to IM software 135 based on the included code or identifier. In step 407, IM software analyzes the print request based on the included code or identifier, and determines that the print request is for the predefined data. In step 409, IM software 135 generates a print job based on the print request, and sends the print job to device 301. For example, IM software 135 may generate a 'Weekly Schedule' view, and then print the Weekly Schedule view to the printer device corresponding to device 301. In step 411, device 301 prints the print job received from computer 110 and IM software 135, resulting in printout 311.

With further reference to FIG. 5, according to an illustrative aspect, when a user presses input button 309 corresponding to the scan function, device 301 scans paper 501 and sends data to computer 110 representing the scanned image of paper 501. The view of FIG. 5 illustrates device 301, after scanning, with paper 501 in the paper output tray 305. In this example, paper 501 includes handwritten annotation 503 made by a user. Annotation 503, in this example, indicates that the user desires to add a dentist appointment for Olivia at 3 p.m. on Sep. 10, 2007. According to an alternative embodiment, the scanner device may automatically detect insertion of paper and initiate scanning without waiting for user input. Stated another way, the user input or user actuation of the device is the fact that the user inserted a document to be scanned into the scanner.

FIG. 6 illustrates a method for performing a scanning function as illustrated in FIG. 5. In step 601, a user loads paper 501 to be scanned into paper feeder 303. In step 603, device 301 detects that the user selected input button 309 to initiate the scanning process. In step 605, device 301 scans paper 501 by feeding paper 501 through scanner module 211 to paper output tray 305, creating a digital image of paper 501. In step 607, device 301 sends the digital image of paper 501 to computer 110, including a code or other identifier indicating the digital image is for IM software 135 and optionally a second code or identifier identifying a type of data contained in the digital image. For example, the second code or identifier may identify the digital image as a scan of a default user's Weekly Schedule. In step 609 the device driver in the computer 110 that receives the digital image analyzes the data to determine that the data is intended for IM software 135, and sends the digital image to IM software 135. In step 611, upon receiving the digital image of paper 501, IM software 135 processes the digital image of paper 501, as further described below (in this example, IM software may detect annotation 505 and add an appointment to the default user's schedule, indicating that Olivia has a dentist's appointment on Sep. 10, 2007, at 3 p.m.).

Figure 7:
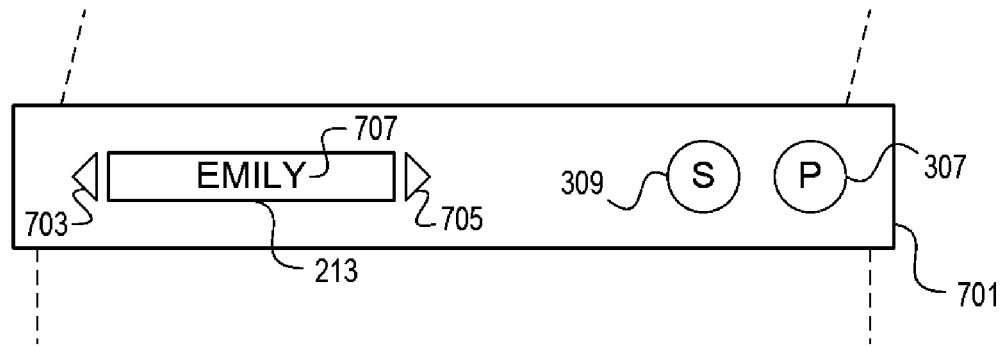
FIG. 7 illustrates a portion of a printer scanner device according to various aspects described herein.

FIGS. 3-6 provide an illustration of various aspects described herein. However, variations and alternatives are also possible. In FIGS. 3-6, device 301 is configured for use with only a single user, at least with respect to printing. That is, device 301 only sends a single code to computer 110 requesting that IM software 135 print desired data. However, device 301 may be modified for use with multiple users, e.g., by inclusion of additional input options to identify a user prior to printing, for example as illustrated in FIG. 7. FIG. 7 illustrates a portion of a device 701 with display 213 and left and right scroll buttons 703, 705. Display 213 displays a user name 707. Left and right scroll buttons 703, 705 may be used to select an alternative user name 707 from a list of applicable users, e.g., all users who have accounts on computer 110 and/or IM software 135. Thus, a user of device 701 may use the left and right scroll buttons 703, 705 to select between users, e.g., Dave, Emily, Olivia, and Evan (in this example, Dave and Emily are Olivia and Evan's parents—Olivia and Evan thus might not have separate accounts). Using device 701, when a user presses input button 307 to initiate the printing function, device 701 generates as part of the print request, a code corresponding to the user 707 indicated in display 213. IM software 135 then uses that code to generate the requested predefined data corresponding to the identified user. Similarly, using device 701, when a user presses input button 309 to initiate the scanning function, device 701 generates as part of the data sent to computer 110 and IM software 135, a code corresponding to the user 707 indicated in display 213. IM software 135 then uses that code to analyze the digital image as corresponding to the identified user.

Device 701 may obtain user information during a setup or initialization phase, or may periodically communicate with IM software 135, 145 to obtain an updated list of users, e.g., via one or more APIs exposed by IM software 135, 145. Alternatively, IM software 135, 145 or computer 110 may notify device 701 whenever an update to the list of users occurs.

Figure 8:
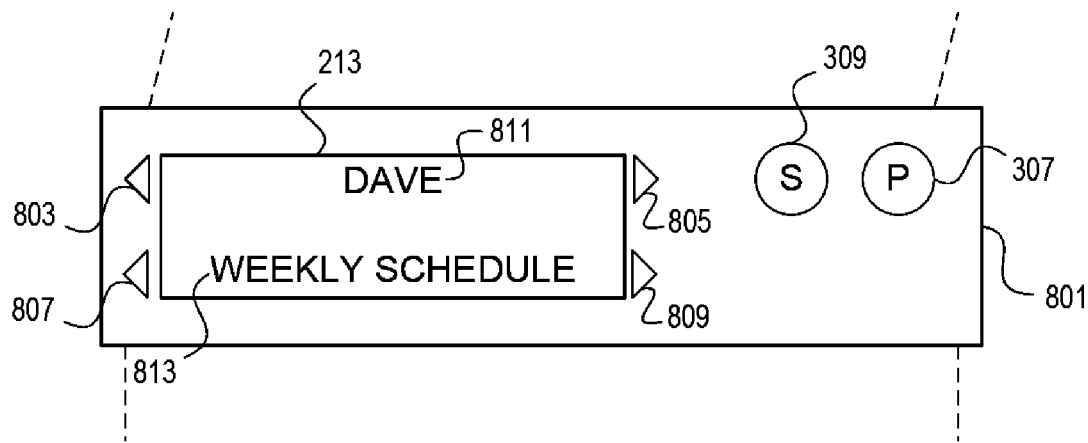
FIG. 8 illustrates a portion of a printer scanner device according to various aspects described herein.

FIG. 8 illustrates a portion of another alternative device 801. Device 801 includes display 213, which indicates a user 811 and a type of data 813. Scroll buttons 803, 805 act similarly to scroll buttons 703, 705 (FIG. 7), allowing a user to select the user to whom the desired information corresponds, while scroll buttons 807, 809 allow a user to select a type of predetermined data. When a user selects the print input button 307, device 801 generates a print request to computer 110 and IM software 135 including the indication of the user, as well as an indication of the type of desired information. IM software 135, upon receiving the print request, generates the requested data or report for the requested user, and sends the resulting print job to device 801. Types of predetermined data may include schedules, lists, contact information, or any other predetermined type or view of data. For example, according to an illustrative aspect, users may use scroll buttons 807, 809 to toggle between a daily schedule, weekly schedule (e.g., shown in FIG. 3 and FIG. 5), monthly schedule, to-do list, and/or any other predefined or user-defined item. For example, while a shopping list may be considered a special type of to-do list, users may desire to quickly print out a shopping list on their way out the door (e.g., to the grocery store), and desire to print the shopping list from a conveniently located device (e.g., near an exit door to the house, in the kitchen, etc.) In such a scenario, a shopping list may be one of the itemized selections the user may select to print at the device. Similarly, using device 801, when a user presses input button 309 to initiate the scanning function, device 801 generates as part of the data sent to computer 110 and IM software 135, a code corresponding to the user 811 indicated in display 213, as well as a code corresponding to the type of data 813 indicated in display 213. IM software 135 then uses the received codes to analyze the digital image as corresponding to the identified user 811 and as including the type of data 813. The types of data may be obtained and maintained similarly to the list of users, described above.

Figure 9:
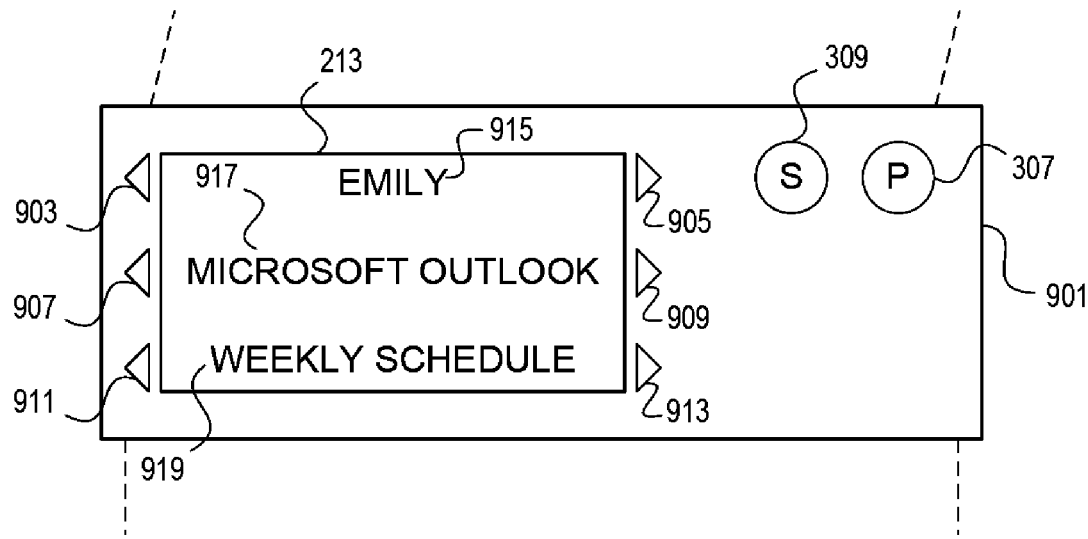
FIG. 9 illustrates a portion of a printer scanner device according to various aspects described herein.

FIG. 9 illustrates a portion of another alternative device 901. Device 901 includes display 213, which indicates a user 915, an application 917, and a type of data 919. Scroll buttons 903, 905 allow a user to select a user name. Scroll buttons 907, 909 allow a user to select an application, and scroll buttons 911, 913 allow a user to select a type of predetermined data. When a user selects the print input button 307, device 801 generates a print request to computer 110 and IM software 135, and the print request includes the indication of the user 915, as well as an indication of the application 917 and the type of desired information 919. A device driver in computer 110 may analyze the print request and route the print request to the indicated application 917. Application 917, upon receiving the print request, generates the requested data or report 919 for the requested user 915, and sends the resulting print job to device 901. Similarly, using device 901, when a user presses input button 309 to initiate the scanning function, device 901 generates as part of the data sent to computer 110, a code corresponding to the user 915 indicated in display 213, a code corresponding to application 917, as well as a code corresponding to the type of data 919. The device driver in computer 110 then routes the digital image to the appropriate application 917 to analyze the digital image as corresponding to the identified user 915 and as including the type of data 919. The list of applications may be obtained and maintained similarly to the list of users, described above.

Device 801, 901 may display various options for the type of data 813, 919 based on the selected user 811, 915, and/or based on the selected application 917, respectively. According to one example, device 801, 901 might store a database or lookup table of corresponding users, applications, and/or types of data. Alternatively, as a user manipulates input controls on device 801, 901, the device might send an indication of the user's selection to computer 110 and/or IM software 135, which provides to device 801, 901 a list of the corresponding users, applications, and/or types of data. For example, if a user selects a IM application such as Microsoft® OUTLOOK®, device 801, 901 might lookup or receive from computer 110 a list of types of data including Daily Schedule, Weekly Schedule, Monthly Schedule, To-Do List, and Shopping List. Such communications may be performed via one or more APIs The aforementioned devices may also be used with software other than IM software 135. For example, if a user selects a navigational application such as Microsoft® STREETS AND TRIPS®, device 801, 901 might lookup or receive from computer 110 a list of types of data including Driving Directions and Area Map. Upon selecting driving directions, the navigational software provides driving directions to a predefined location, e.g., to all appointments on the user's schedule for today. Driving directions may alternatively be an option under the IM software selection in field 917.

Further options may be included on any aforementioned device to select different or additional types of data or different levels of data. For example, device 901 may be modified to include a fourth input field, e.g., for use when a user desires to print driving directions associated with a daily schedule. Thus, when the user selects Daily Schedule as the type of data 919 from the IM software identified in field 917, the user may select a fourth input defining the type of data to be provided about the Daily Schedule, e.g., selecting from Detailed View and Driving Directions, among other options. Thus, the aforementioned devices are not limited to any specific level or detail of input, or any specific types of information.

Any of the aforementioned devices may provide or allow a user to select from additional or different information. For example, according to one aspect a user may select a date range on display 213, and the date range is provided back to computer 110 for use in generating the requested data or print job. In another example the user might use a first line of display 213 and input module 215 to select a contact name from IM software 135. The device then sends the selected contact name to computer 110 and IM software 135. IM software 135 then sends data corresponding to the selected contact name to the device, which displays the information on display 213 and/or prints the information. Such communications may be performed via one or more APIs.

In addition, while FIGS. 7-9 illustrate specific configurations and types of input mechanisms, other configurations and/or input mechanisms may alternatively be used. For example, instead of scroll buttons, a device such as device 301, 701, 801, 901 may include a scroll wheel, touch pad, dial, button, switch, lever, etc., to accomplish a similar result, i.e., the selection of a user, a type of predetermined information, etc. According to another alternative, any of the aforementioned devices might include one button for printing a first type of data (e.g., a weekly schedule), and a separate button for printing a second type of data (e.g., a to-do list). Similar arrangements may be used for scanning.

In addition to varying the types of input mechanisms, other embodiments provide different capability levels in the printing device, e.g., with respect to memory, processing, and intelligence. For example, a device such as device 201 may locally cache data in a memory 205, 207 of the device, such that the device need not communicate with a remotely located computer for each print request. When a print request is received from a user, the device 201 generates the print job locally, without communicating with host computer 110. Device 201 may periodically synchronize the cached data with the data managed by IM software 135, similar to a PDA synchronizing data with a host computer. Synchronization may occur at predetermined intervals, whenever a connection to the host computer 110 is accessible, based on user settings, or other criteria. Such an embodiment provides high reliability and availability of the device 201 because device 201 is not required to have an active connection to host computer 110. Indeed, host computer 110 need not even be turned on.

According to another aspect, any of the aforementioned devices may store previous print requests and/or print jobs in memory, and a user may select from a list of recent actions with saved configurations, so that user(s) can easily repeat recent prints and/or scans, without requiring the device to recreate the request by sending a new request to the host computer 110.

According to another aspect, referred to as a metapaper system, a user can print desired information, update the information by writing on the printout, and scan the printout back to the computer to automatically incorporate the updated information written by the user. Any of the aforementioned devices may be used in such a system, whereby a piece of printed paper becomes metapaper, i.e., a physical copy of printed matter that can be marked up or annotated by a user, and can be intelligently scanned and analyzed for the computer 110 to automatically incorporate the changes into an original source file or document.

A metapaper system combines the distinct virtues of paper with those of digital devices for the purposes of individual or group information management using IM software 135. That is, paper has some advantages over currently available devices, both in terms of the properties of paper as a display medium as well as the utility of paper for information management. For example, compared to an LCD display (e.g., on a device), printed paper generally has higher resolution and contrast, can be folded, never needs recharging, and weighs next to nothing. On the other hand, digital information devices (PDAs, PCs, etc,) have their own advantages, including their flexibility (i.e., can run various application software), their ability to participate in an information system wherein information comes from multiple sources and is presented in multiple devices. Stated another way, a traditional piece of printed paper could not previously be synchronized with a database. Using metapaper as described herein, however, printed paper can be synchronized with a database.

Figures 10, 13:
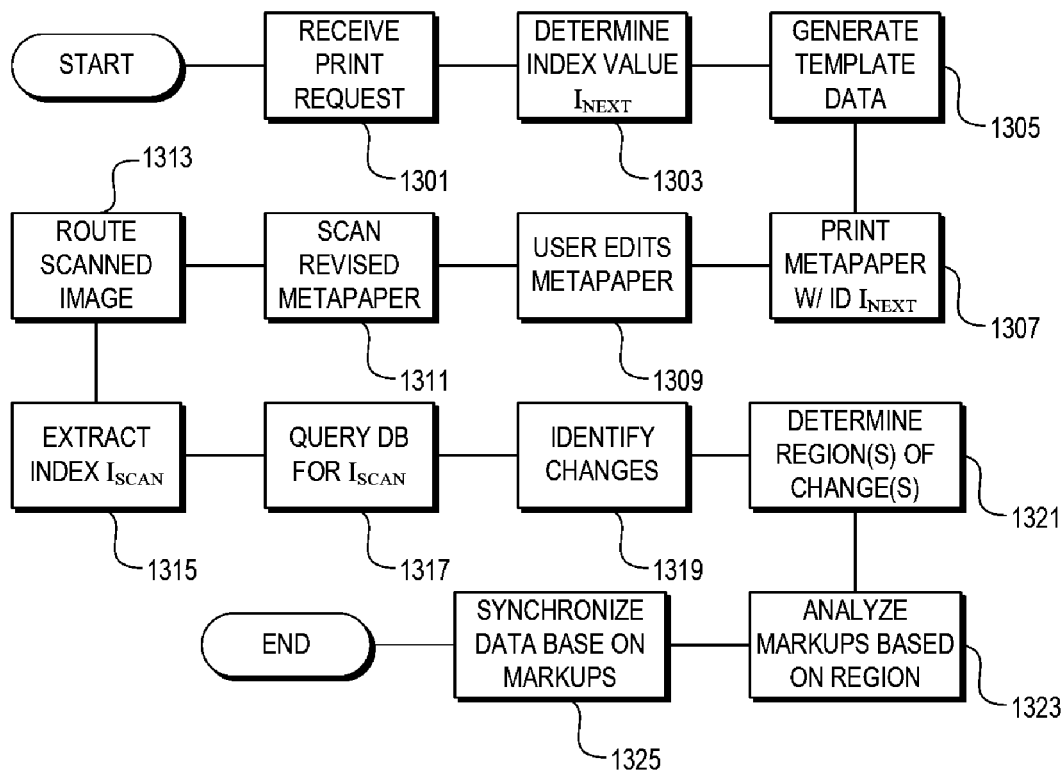
FIG. 10 illustrates a template database according to various aspects described herein.
FIG. 13 illustrates a method for managing metapaper according to various aspects described herein.

As indicated above, metapaper refers to a physical copy of printed matter that can be marked up or annotated by a user, and can be intelligently scanned and analyzed for a computer to automatically incorporate the changes into or synchronize the changes with an original source file or document. In order to create, manage, and modify/synchronize information using metapaper, a computer system, such as system 100, may include a metapaper database storing information such as that illustrated in FIG. 10. FIG. 10 illustrates database 1001 storing information including a template index 1003, application identifier 1005, user identifier 1007, and template information 1009. Database 1001 may be stored in any computer memory or storage device, e.g., on hard disk drive 141. Database 1001 may also include a database manager module (not shown) that handles queries for information about or information stored in database 1001.

Template index 1003 can be any ID, identifier or value that uniquely identifies the corresponding information, or row, in database 1001, and is not limited to text, numbers, hex, or any other identification mechanism, so long as index 1003 can be uniquely tied to a template. Uniqueness need not be forever, but rather represents probabilistic uniqueness such that the same index is not likely repeated within a relevant amount of time. Similarly, application identifier 1005 need not be readable alphanumeric, such as is shown in FIG. 10, but rather can be any value that identifies a particular application. For example, a name of an executable program may be used to represent an actual executable file associated with the desired application program. User ID 1007 identifies a user having an account on computer 110 and/or application 1005. The user may be left blank or otherwise indicate a default account.

Template 1009 stores the template information for a specific printed piece of metapaper. That is, each template represents a pattern against which a scanned document can later be compared to identify differences. A template may include a stored representation of a specific piece of printed metapaper, e.g., a bitmap or other data from which the document can be regenerated, and may include the type and location of various regions of the specific piece of metapaper, as well as the contents of the document as printed.

The values and information illustrated in FIG. 10 as stored in database 1001 are illustrative only, and are not intended to limit the scope or type of information in database 1001. As indicated above, any data or value can be stored that serves the same function or purpose. Additionally, the database may have different or additional data fields as those shown in FIG. 10 to further the implementation of metapaper described herein.

Figure 11:
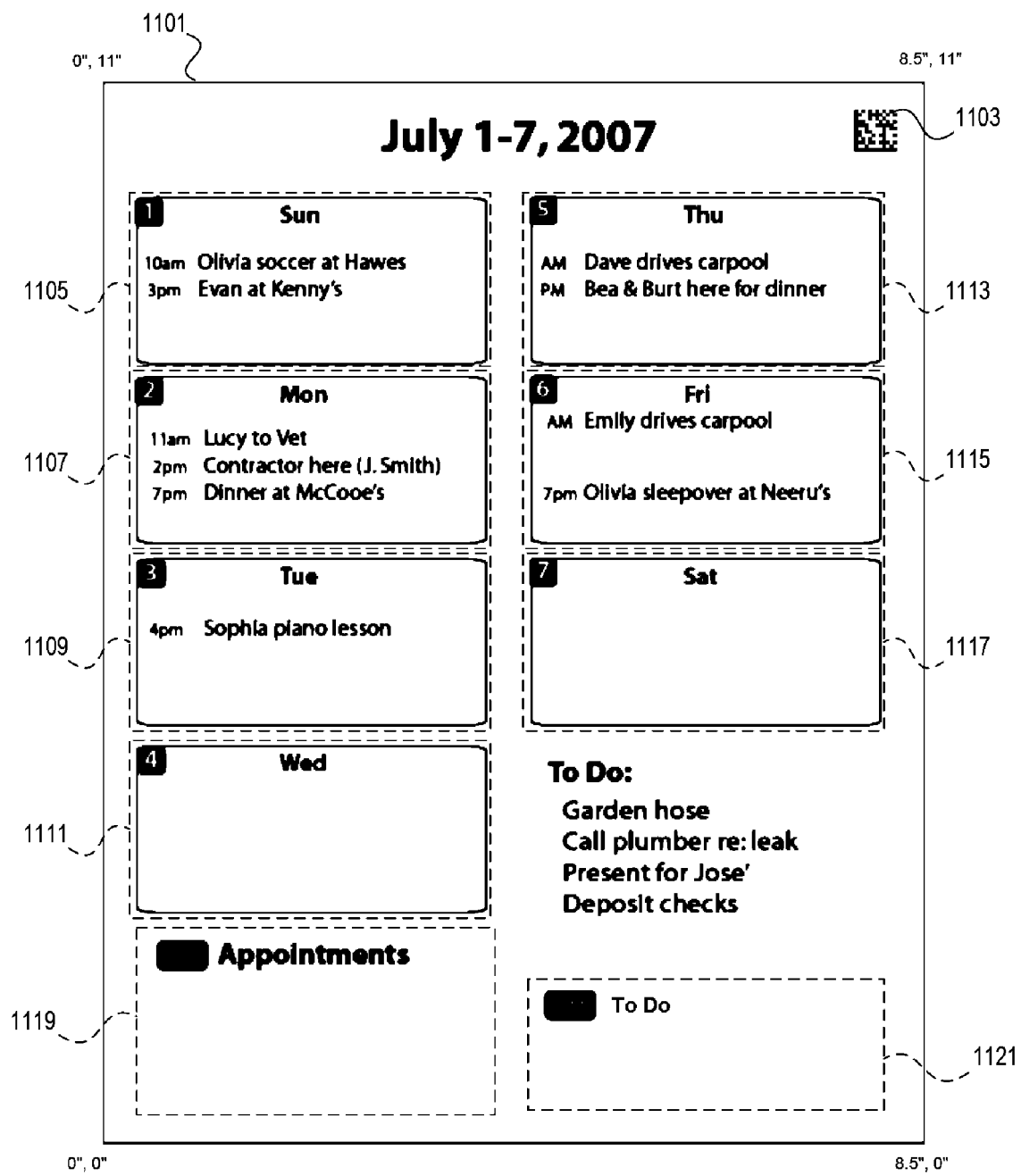
FIG. 11 illustrates metapaper with superimposed template information according to various aspects described herein.

FIG. 11 illustrates a logical view of a printed piece of metapaper 1101 with superimposed template information. Metapaper 1101 includes printable indicia 1103, which corresponds to an index value stored in database 1001, and which uniquely identifies the document. Upon subsequent scanning of the document, the page can be compared against a template image that was formed when the page was printed. Here, printable indicia 1103 is shown as a Datamatrix barcode and represents the index value 01004734 from database 1001. Other types of printable indicia may be used, including one-dimensional and two-dimensional barcodes such as, but not limited to, Code 128, UPC-A, EAN/JAN-13, PDF 417, Maxi-Code, and the like, as well as any other scannable and readily recognizable printable indicia that provides a unique identity. According to an alternative embodiment, the printable indicia 1103 may comprise the entire document itself. That is, each printout may be identified by the data printed thereon, as a sort of fingerprint of that document. Such an alternate embodiment may use the graphical content of a particular printed document to uniquely identify that document, e.g., when the content of the printed document is stored in a corresponding template. When printable indicia 1103 is referred to herein, this alternative embodiment is encompassed as well.

Template indicia 1105-1121 are shown in broken line format to represent the template regions, but that template regions may be stored in template field 1009 of database 1001 as corresponding to Index value 01004734, and such regions are not necessarily printed when metapaper 1101 is printed. Region 1105 is stored as corresponding to Sunday, Jul. 1, 2007; region 1107 is stored as corresponding to Monday, Jul. 2, 2007; region 1109 is stored as corresponding to Tuesday, Jul. 3, 2007; region 1111 is stored as corresponding to Wednesday, Jul. 4, 2007; region 1113 is stored as corresponding to Thursday, Jul. 5, 2007; region 1115 is stored as corresponding to Friday, Jul. 6, 2007; region 1117 is stored as corresponding to Saturday, Jul. 7, 2007; region 1119 is stored as corresponding to new appointments or modifications to appointments; and region 1121 is stored as corresponding to new items for a to-do list or modifications to a to-do list. Database 1001 stores the region information in template field 1009 as a sort of map or guide of printout 1101 having the index value identified by printable indicia 1103. Template field 1009 may also store an indication of the paper size for that template, as well as a bitmap or other image of the metapaper as printed for later comparison.

Template regions may be identified and stored using any methodology that can identify physical regions on printed matter. For example, according to an aspect where each region is rectangular, each region may be defined by the offset of the lower left corner of the region from the lower left corner of the paper (based on known paper size), and also including length and width values. FIG. 12 illustrates metapaper template 1201 for metapaper 1101 in a markup language format.

For ease of understanding, the region information presented in FIG. 12 includes region IDs corresponding to the reference numbers of the various regions illustrated in FIG. 11. Actual region IDs may differ, or use other values or numbering systems. Some of the representations of data values in FIG. 12 may be logical in nature, and the actual storage format may differ. For example, FIG. 12 indicates that the data of region 1119 corresponds to "Appointment." However, the DATA value of a region can be any value or identifier understandable by the application to which the template corresponds. Thus, any file, text, or binary image may be used as the DATA value, e.g., a picture, digital ink, etc. In the example of FIG. 12, "Appointment" may be understood by the application OUTLOOK® to indicate that the region stores new appointment information or modifications to existing appointment information.

In this example, metapaper template 1201 indicates that it corresponds to metapaper having an Index=01004734, User=Emily, and Application=OUTLOOK®. Metadata template 1201 also indicates that metapaper 1101 was printed on paper measuring 8.5 inches wide by 11 inches long. Metapaper template 1201 further indicates that region 1105 of metapaper 1101 has a lower left corner offset of 0.3 inches from the left edge and 8.0 inches from the bottom edge of metapaper 1101, the size of this region is 3.8 inches wide by 1.8 inches tall (or long), and this region corresponds to the date Jul. 1, 2007.

Metapaper template 1201 further indicates that region 1107 of metapaper 1101 has a lower left corner offset of 0.3 inches from the left edge and 6.1 inches from the bottom edge of metapaper 1101, the size of this region is 3.8 inches wide by 1.8 inches tall (or long), and this region corresponds to the date Jul. 2, 2007. Metapaper template 1201 further indicates that region 1109 of metapaper 1101 has a lower left corner offset of 0.3 inches from the left edge and 4.3 inches from the bottom edge of metapaper 1101, the size of this region is 3.8 inches wide by 1.8 inches tall (or long), and this region corresponds to the date Jul. 3, 2007. Metapaper template 1201 further indicates that region 1111 of metapaper 1101 has a lower left corner offset of 0.3 inches from the left edge and 2.3 inches from the bottom edge of metapaper 1101, the size of this region is 3.8 inches wide by 1.8 inches tall (or long), and this region corresponds to the date Jul. 4, 2007. Metapaper template 1201 further indicates that region 1113 of metapaper 1101 has a lower left corner offset of 4.8 inches from the left edge and 8.0 inches from the bottom edge of metapaper 1101, the size of this region is 3.8 inches wide by 1.8 inches tall (or long), and this region corresponds to the date Jul. 5, 2007. Metapaper template 1201 further indicates that region 1115 of metapaper 1101 has a lower left corner offset of 4.8 inches from the left edge and 6.1 inches from the bottom edge of metapaper 1101, the size of this region is 3.8 inches wide by 1.8 inches tall (or long), and this region corresponds to the date Jul. 6, 2007. Metapaper template 1201 further indicates that region 1117 of metapaper 1101 has a lower left corner offset of 4.8 inches from the left edge and 4.3 inches from the bottom edge of metapaper 1101, the size of this region is 3.8 inches wide by 1.8 inches tall (or long), and this region corresponds to the date Jul. 7, 2007. Metapaper template 1201 further indicates that region 1119 of metapaper 1101 has a lower left corner offset of 0.4 inches from the left edge and 0.3 inches from the bottom edge of metapaper 1101, the size of this region is 3.7 inches wide by 1.9 inches tall (or long), and this region corresponds to new appointment information. Metapaper template 1201 further indicates that region 1121 of metapaper 1101 has a lower left corner offset of 4.5 inches from the left edge and 0.3 inches from the bottom edge of metapaper 1101, the size of this region is 3.6 inches wide by 1.4 inches tall (or long), and this region corresponds to new items for a to-do list.

While FIG. 12 illustrates template information in a markup language format, other storage formats may be used, including other forms of markup language (e.g., XML), alphanumeric data, binary data, hex data, and/or any predefined storage format. In addition, while FIG. 12 illustrates repetitive storage of Index, Application, and User information, such information need not be included if already stored in another location of database 1001. That is, the representation of FIG. 12 may be used to replace an entire row of database 1001, or may be used as just the template field 1009.

For example, another template storage scheme may use a binary map obtained by processing the original printed document into a binary map. The printed matter image may be smoothed and thresholded to obtain the binary map, which may then be dilated or eroded to expand or shrink the ink regions. The resulting binary map of each region may then be stored in a compressed form. In yet another approach, non-rectangular regions defined through unions and intersections of lines, arcs, and polygons may be used. In each embodiment, however, database 1001 stores information from which the content of the metapaper can be recreated, .e.g., a bitmap, or the original data (including format and content) used to generate and print the metapaper.

FIG. 13 illustrates a method of managing metapaper as a new print request is received, the user manually marks up the printed metapaper, and scans the metapaper for synchronization. Markup refers to a user editing or making handwritten annotations on the printout, e.g., with a pen or other writing instrument, after printing the document. Initially, in step 1301, an application, such as IM software 135, receives a request from a user to print some document or data in a form suitable for manual markup by the user. While IM software 135 is used for the remainder of this example, other software applications may also benefit from the use of metapaper. In step 1303, the software determines an index value for the metapaper, e.g., by querying metapaper database 1001 for an available Index value $I_{NEXT}$.

In step 1305, IM software 135 (or other software working in conjunction with preexisting IM software) generates template information corresponding to the metapaper having index value $I_{NEXT}$. Template information may be generated in a variety of ways, depending on the software application and the resultant information displayed on the metapaper. According to one aspect, default template information for a predetermined view may be stored as part of the view information in the software application from which it is generated. For example, IM software 135 might provide various data views or reports to a user, including Weekly Schedule and Monthly Schedule. IM software 135 stores information regarding the layout of each view/report so that IM software 135 knows how to generate and print each respective report. Such information might include the size and location of the various data regions, such as those illustrated with respect to metapaper 1101. According to another aspect, a separate metapaper manager application may provide the ability for a user to scan in any document, manually highlight template regions, and input the data type or value to which each region corresponds. The metapaper manager application then stores the template in database 1001. In such an alternate scenario, in step 1305 IM software 135 might prompt the user to select a template from database 1001 to which the requested printout corresponds, and the template data is generated based on the user selection. Other template information generation mechanisms may also be used.

Figure 14:
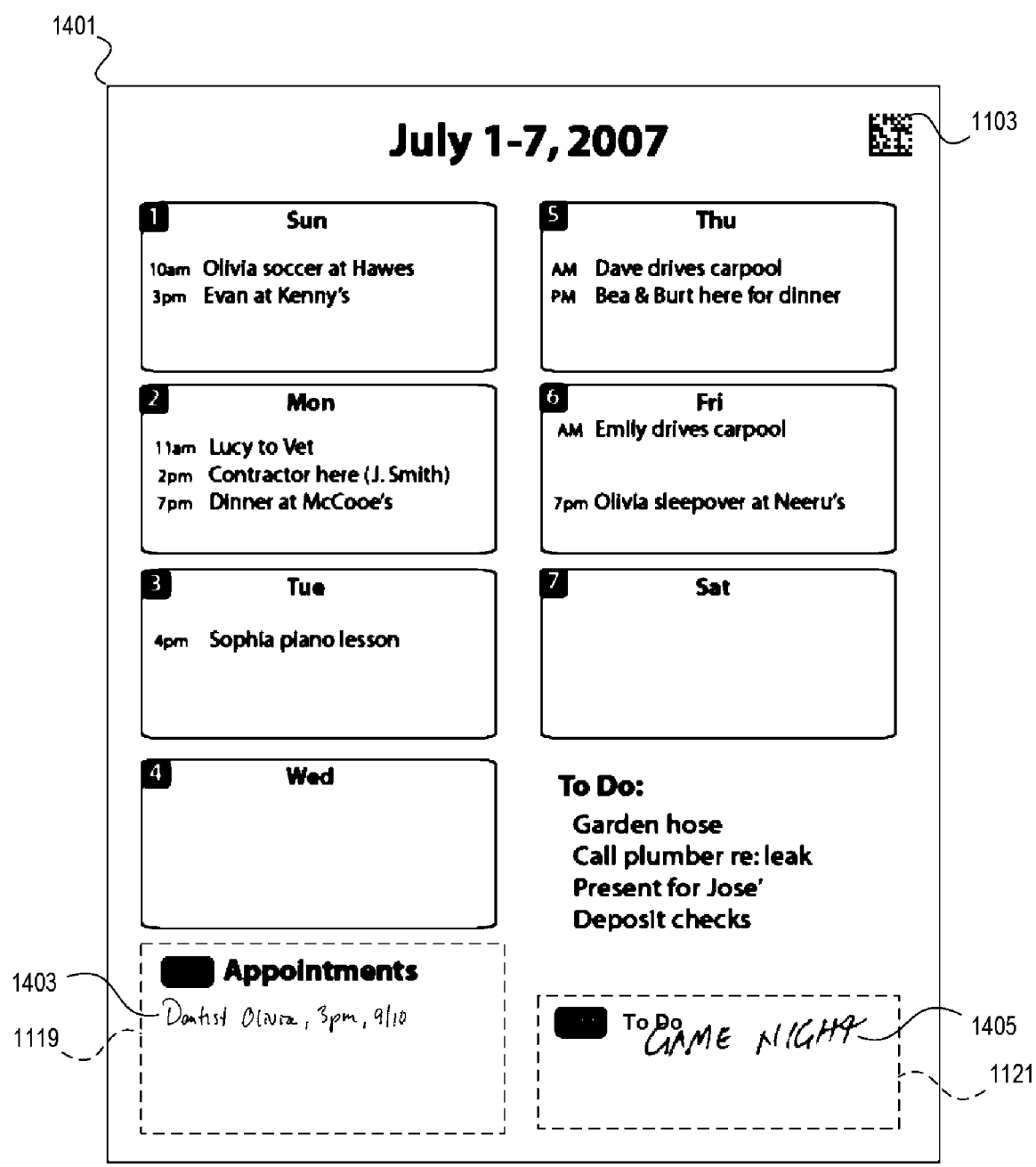
FIG. 14 illustrates a scanned image of a metapaper document including markups made by a user according to various aspects described herein.

In step 1307 the IM software 135 (or other software that has access to the IM data) spools the print job for the requested data and/or data view to print metapaper 1101 on a printer, e.g., printer 188 or any of the aforementioned devices, with ID code 1103 representing the index value $I_{NEXT}$. Sometime after printing, in step 1309, the user makes changes (handwritten annotations) to metapaper 1101, as illustrated in FIG. 14. As shown in FIG. 14, the user has added annotation 1403 in template region 1119 corresponding to new appointments, and annotation 1405 in template region 1121 corresponding to new tasks or items for a to-do list. In step 1311, the user scans metapaper 1101 with the handwritten annotations 1403, 1405, e.g., using any scanner such as any of the aforementioned scanner devices, and the scanned image 1401 is provided to a scanner device driver executing on the computer 110.

In step 1313, the scanned image is routed to an appropriate application. Routing may be managed at a variety of levels, depending on implementation. For example, the device driver might be programmed to recognize the presence of ID indicia 1103. When ID indicia 1103 is detected, the device driver may query database 1001 for the Application 1005 corresponding to the value of the ID indicia, and then route the scanned image 1401 to that application. Alternatively, the device driver might simply route all incoming images to a predetermined application. For example, when scanned using scanner 301, 701, 801, or 901, the scanner might be associated by default with IM software 135. In such a scenario, the scanned image 1401 might be routed directly to IM software 135 or a metapaper manager application that works in conjunction with IM software 135.

In step 1315 the application analyzes ID indicia 1103 (or the entire scanned image) to determine and extract the index value $I_{SCAN}$ corresponding to scanned image 1401, and in step 1317 queries database 1001 for the template information corresponding to the index value $I_{SCAN}$. Upon retrieving the template information corresponding to index value $I_{SCAN}$, IM application 135 in step 1319 compares the scanned image 1401 to the template to identify areas in which the user has made changes. According to one aspect, IM software 135 may compare a stored bitmap or image of the original printout of metapaper 1101 with the scanned image 1401. For example, as illustrated in FIG. 12 ("BITMAP= . . . "), database 1001 may store an image of the metapaper as printed. Database 1001 may alternatively store data from which the metapaper as printed may be regenerated. IM software 135 may compare the scanned image with the bitmap (or other stored data) to identify differences between the two.

According to one illustrative aspect, where the template includes a bitmap of the original printed document, the bitmap may be automatically generated by software using a print driver, without the need for a physical printer or scanner. The scanned image may differ from the bitmap due to user markup and possible scanning artifacts. The IM software first aligns (corrects for scaling, rotation, shear, etc) the scan with the template bitmap. Then the IM software uses the binary map and template to identify inkable regions. The binary map defines page regions where the user could have inked (the white regions of the page designed to be marked/filled in by the user). Because the original image and the scanned image have been aligned, the binary map may be applied to the scanned image to find regions where the user could have inked. These regions are scanned or further processed for user handwriting and markup(s). In the present example, IM software 135 identifies annotation 1403 and annotation 1405.

In step 1321, IM software identifies or determines the region(s) in which each annotation or change 1403, 1405 is located, based on the region information stored as part of the template 1009, e.g., as illustrated in FIG. 12. Here, IM software determines that annotation 1403 occurs in region 1119 corresponding to new appointments, and determines that annotation 1405 occurs in region 1121 corresponding to new items for a to-do list. In step 1323, IM software 135 analyzes the annotations based on the region in which each is located. IM software 135 may expect certain types of data or information in each region, and/or may make various assumptions about an annotation based on the region in which it is located. Here, IM software assumes that markup 1403 relates to appointments rather than something else (e.g., a request to send an email). Such an assumption may include specifically looking for date/time information in annotation/markup 1403. Similarly, IM software 135 assumes that markup 1405 relates to a to-do list rather than something else (e.g., an address for an address book). Other regions may include other assumptions. For example, when a region is associated with a particular date, IM software may automatically assign that date as a due date or appointment date for any annotation or markup in that region. When a region is associated with contact information, IM software 135 may analyze the annotation or markup with respect to identifying a contact name, address, telephone, email address, and/or other relevant contact information. Thus, each region has default information with which it is associated, and such default information may be used to aid in the analysis of the markup or annotation, e.g., by using the default information to assist with handwriting recognition.

In step 1325, IM software 135 modifies information in a source file accordingly to synchronize the database with the new information. Here, IM software 135 creates an appointment on Sep. 10, 2007, at 3 pm for Olivia to go to the Dentist, and adds the item "Game Night" to a to do list. If a markup relates to an entry already in IM software 135, that entry might be updated based on the new information provided via scan 1401. For example, were the user to cross out the time '4 pm' next to 'Sophia piano lesson' in region 1109 associated with Jul. 3, 2007, and write-in '10 am,' IM software may modify the existing appointment by changing the appointment start time from 4 P.M. to 10 A.M.

While FIG. 13 illustrates a method according to various aspects described herein, one or more steps may be optional, additional steps may be added, steps may be combined and/or split up, and steps may be performed in other than their recited order. In addition, methods according to various aspects described herein might only include a portion of the steps illustrated in FIG. 13. For example, a printing method might only include steps 1301-1307, whereas a scanning method might only include steps 1311-1325.

Figure 15:
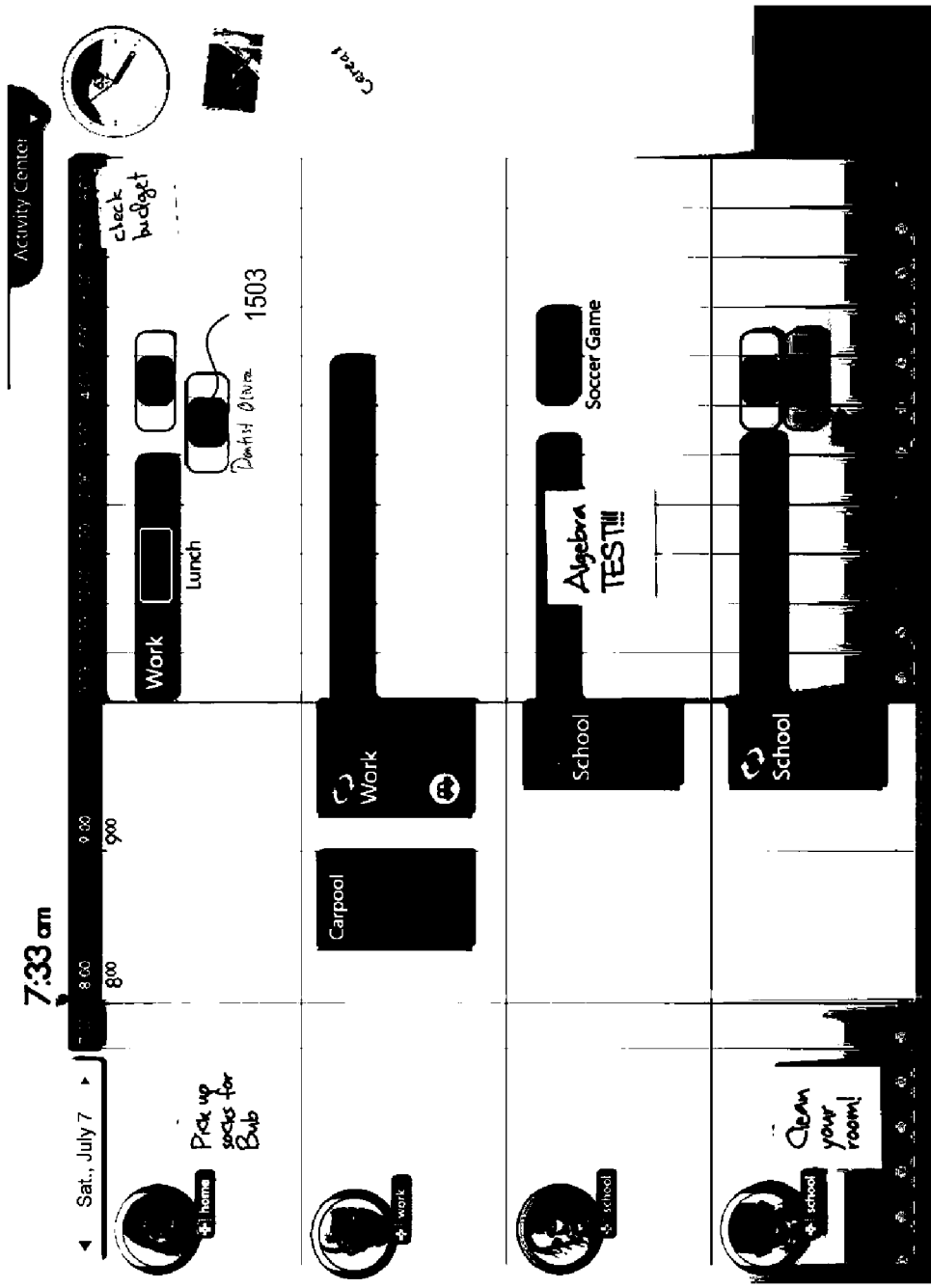
FIG. 15 illustrates a screenshot of an IM software application after updating information based on a scanned metapaper image according to various aspects described herein.

The modifications based on annotations 1403, 1405 may be used and presented in various ways. According to a first aspect, FIG. 15 illustrates a sample screen display 1501 of IM software 135. Screen display 1501 illustrates a calendar view for Jul. 7, 2007, and includes new appointment 1503 based on annotation 1403. According to another aspect, FIG. 16 illustrates metapaper 1601, printed subsequent to the incorporation of annotations 1403, 1405 using the method of FIG. 13. On metapaper 1601, appointment 1603 corresponds to annotation 1403, and to-do list item 1605 corresponds to annotation 1405.

According to another aspect, when subsequently viewed, portions of the annotations may remain in the user's handwriting, while other portions may be converted to data values. As is evident in FIG. 15 and FIG. 16, with respect to appointment 1503, 1603, IM software determined the date and time for the appointment, and converted them to data values (date and time information can be extracted from handwritten information with high accuracy, using known handwriting recognition techniques). However, unlike ink recognition on a tablet PC, scanned image 1401 provides no context regarding the manner, or strokes, with which the handwriting was written, but rather merely represents the handwriting as a static image. Without such context information, handwriting recognition can be inaccurate, and accuracy can vary widely depending on the context in which handwriting is analyzed (e.g., whether the handwriting represents notes, prose, poetry, technical writing, etc.). It may thus be difficult to correctly interpret descriptive markups. To account for this possible inaccuracy, IM software 135 may store an image of at least a portion of the handwritten annotation that is not interpreted, because a user generally is able to read his or her own handwriting. As illustrated in FIG. 15 and FIG. 16, appointment 1503, 1603 includes an image of the user's handwriting representing the text "Dentist Olivia." Similarly, to-do list item "GAME NIGHT" 1605 is represented as an image of the user's original handwriting. According to another aspect, IM software 135 might attempt to perform handwriting recognition of all markup information, and convert all handwriting to formatted text.

Using any or all of the above recited aspects, metapaper enables computer-readable items to be added and modified in a IM application or other software by writing on a previously printed document. Such a system may be used to add, modify, and/or delete items including appointments, notes, tasks, lists, and list items (e.g., groceries), among others. Each such item is added in one or more distinct regions on the printed metapaper document. Any writing in each region is understood by the software application to be a description or a deletion of an existing item of a type corresponding to that region. A deletion can be indicated by drawing a line through an existing item.

Metapaper may be integrated with a purpose-built device, e.g., device 301, 701, 801, 901 described above. With such a pairing, a request to print, e.g., using input button 307, might always generate a metapaper document. Similarly, a request to scan, e.g., using input button 309, might always result in the scanned image being sent to an application that can identify a scanned image as scanned metapaper and route/manage the metapaper appropriately. Such a device, or IM software 135 (or other application software) may be further configured such that, upon receipt of a scanned metapaper image and updating the information accordingly, a new schedule or copy of the metapaper is automatically printed, including the updated information.

Thus, according to one illustrative usage scenario, a user may print out a weekly schedule at the beginning of the day and take the metapaper printout with her as she leaves the house to run errands. At the end of a dentist visit, the user makes an appointment for her next checkup. She writes the date, time and description for the appointment into the new appointments region of her metapaper printout. Back at home, the user puts the metapaper printout into her scanner and rescans the document. The software extracts the new appointment, and puts an image of the handwritten description into her schedule on the appropriate date and time. The software and/or printer/scanner device might automatically print an updated schedule, including the most up-to-date information. This is but one possible illustration for the benefits bestowed by various aspects described herein.

Using any of the aforementioned devices and metapaper described herein, alone or in combination with each other, users gain remote access to important information and the ability to update the information using interactive qualities of printed paper. The aforementioned devices provide quick access to information (e.g., schedule, tasks, lists, contacts, etc.) and functions (e.g., printing and scanning), and may include an input device for each type of information and/or function. Users can then request the desired information to be printed at the press of a button. When used with metapaper, a user can quickly mark up a printed document, scan the marked up document, and synchronize the changes with the original source data. The combination of printing and scanning in a single, small form factor device allows users to complete the data synchronization cycle (print, markup, scan) using only a single device, which can be conveniently located in a primary gathering room, or hub, room of a household (e.g., kitchen, family room, foyer, etc.) without taking up often limited space.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more tangible computer readable storage media storing executable instructions for performing a method of managing printed data, said method comprising steps of:

receiving a print request to print a known view comprising a calendar of an information management software application, said calendar having one or more calendar entries;

storing template information corresponding to the print request in a database as a database entry, said stored template information comprising a unique template index and template region information identifying one or more regions on a printed document printed based on the print request, wherein the unique template index identifies the database entry, said database entry comprising a specification of a user of the calendar of the received print request and further comprising a specification of the information management software application;

generating a print job based on the print request, said print job defining the printed document, wherein said printed document comprises a first indicia uniquely identifying the template index in the database entry and a plurality of template indicia each identifying a different one of said one or more regions in said database entry;

sending the print job to a printer for printing the printed document;

receiving a digital image of a scanned document, said scanned document comprising the printed document having a handwritten change;

extracting a second indicia from the received digital image;

determining that the second indicia identifies the unique template index in the database entry the database; and comparing the digital image with the template information to detect and extract the handwritten change between the printed document as compared to the scanned document;

determining the extracted handwritten change to be a desired calendar entry, said determining comprising determining the application corresponding to the database entry to be the information management software application;

converting a first portion of the extracted handwritten change into a data value, said first portion comprising recognized handwriting;

generating from the data value of the first portion a new calendar entry for the calendar of the user specified in the database entry of the information management software application, said generated entry corresponding to the desired calendar entry;

appending a remainder portion of the extracted handwritten change which is not converted into the data value to the generated new calendar entry as a stored image of a handwritten annotation, said remainder portion comprising non-recognized handwriting; and adding the generated new calendar entry to the one or more calendar entries of the calendar of the information management software application.

2. The computer readable storage media of claim 1, wherein said known view comprises one of a weekly schedule and a monthly schedule.

3. The computer readable storage media of claim 1, said adding further comprising updating an existing calendar entry with the new calendar entry.

4. The computer readable storage media of claim 3, said method further comprising determining the extracted handwritten change to be a desired calendar entry based on a first region of the one or more regions in which the handwritten change is located.

5. The computer readable storage media of claim 4, wherein the handwritten change identifies a date, a time, and a description of an appointment, and the generated new calendar entry comprises an appointment for the identified date and the identified time.

* * * * *